US012769967B2

(12) United States Patent
Kita

(10) Patent No.: US 12,769,967 B2
(45) Date of Patent: Oct. 20, 2026

(54) IMAGE FORMING APPARATUS

(71) Applicant: CANON KABUSHIKI KAISHA, Tokyo (JP)

(72) Inventor: Hiroshi Kita, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/018,521

(22) Filed: Jan. 13, 2025

(65) Prior Publication Data

US 2025/0148243 A1 May 8, 2025

Related U.S. Application Data

(63) Continuation of application No. 18/324,866, filed on May 26, 2023, now Pat. No. 12,223,374.

(30) Foreign Application Priority Data

Jun. 3, 2022 (JP) ................................ 2022-091072

(51) Int. Cl.
*G06K 15/12* (2006.01)
*G03G 15/01* (2006.01)
*G03G 15/06* (2006.01)
*G03G 15/08* (2006.01)

(52) U.S. Cl.
CPC ....... *G06K 15/129* (2013.01); *G03G 15/0136* (2013.01); *G03G 15/0189* (2013.01); *G03G 15/065* (2013.01); *G03G 15/0896* (2013.01)

(58) Field of Classification Search
CPC ........... G03G 15/5008; G03G 15/0131; G03G 15/5058; G03G 15/556; G03G 15/0806
See application file for complete search history.

(56) References Cited

U.S. PATENT DOCUMENTS 9,612,557 B2 * 4/2017 Yuasa ................ G03G 15/5008
10,691,036 B2 * 6/2020 Iwadate ............ G03G 15/0136
12,223,374 B2 * 2/2025 Kita .................. G03G 15/0808
2016/0085193 A1 * 3/2016 Yuasa ................ G03G 15/0136 399/39
2016/0091858 A1 3/2016 Shiraki
(Continued)

FOREIGN PATENT DOCUMENTS

JP 2002148893 A 5/2002
JP 2005010759 A 1/2005
(Continued)

*Primary Examiner* — Jessica L Eley
(74) *Attorney, Agent, or Firm* — Canon U.S.A., Inc. IP Division

(57) ABSTRACT

An image forming apparatus includes a first image forming unit, a second image forming unit, and a control unit configured to control the first image forming unit and the second image forming unit. The control unit performs control so as to allow execution of a first mode and a second mode in which a color gamut of an image to be formed on a printing material is expanded from the first mode, as an image forming mode for forming an image on a printing material. The second mode includes a second single-color mode in which image formation is performed by only the first image forming unit and a second multicolor mode in which image formation is performed by the first image forming unit and the second image forming unit.

9 Claims, 6 Drawing Sheets

STATES OF CONTACT WITH/SEPARATION FROM PHOTOSENSITIVE DRUM

| TARGET MEMBER | NORMAL MODE | | WIDE COLOR GAMUT MODE | |
|---|---|---|---|---|
| | FOR SINGLE-COLOR | FOR MULTICOLOR | FOR SINGLE-COLOR | FOR MULTICOLOR |
| DEVELOPING ROLLER 3K | IN CONTACT | IN CONTACT | IN CONTACT | IN CONTACT |
| PRIMARY TRANSFER ROLLER 6K | IN CONTACT | IN CONTACT | IN CONTACT | IN CONTACT |
| DEVELOPING ROLLERS 3Y, 3M, 3C | SEPARATED | IN CONTACT | SEPARATED | IN CONTACT |
| PRIMARY TRANSFER ROLLERS 6Y, 6M, 6C | SEPARATED | IN CONTACT | SEPARATED | IN CONTACT |

STATES OF CONTACT WITH/SEPARATION FROM PHOTOSENSITIVE DRUM

| TARGET MEMBER | WIDE COLOR GAMUT MODE (FOR SINGLE-COLOR) | |
|---|---|---|
| | SETTING 1 | SETTING 2 |
| DEVELOPING ROLLER 3K | IN CONTACT | IN CONTACT |
| PRIMARY TRANSFER ROLLER 6K | IN CONTACT | IN CONTACT |
| DEVELOPING ROLLERS 3Y, 3M, 3C | SEPARATED | IN CONTACT |
| PRIMARY TRANSFER ROLLERS 6Y, 6M, 6C | SEPARATED | IN CONTACT |

(56) References Cited

U.S. PATENT DOCUMENTS

| | | | | |
|---|---|---|---|---|
| 2017/0090345 | A1* | 3/2017 | Katayama .......... | G03G 15/6585 |
| 2017/0343944 | A1* | 11/2017 | Matsuura ........... | G03G 15/0189 |
| 2019/0346784 | A1 | 11/2019 | Kita | |
| 2020/0089152 | A1 | 3/2020 | Kume | |

FOREIGN PATENT DOCUMENTS

| | | | |
|---|---|---|---|
| JP | 2005111770 | A | 4/2005 |
| JP | 2013130662 | A | 7/2013 |
| JP | 2014109332 | A | 6/2014 |
| JP | 2016021048 | A | 2/2016 |
| JP | 2016095390 | A | 5/2016 |
| JP | 2017173458 | A | 9/2017 |
| JP | 2017173465 | A | 9/2017 |
| JP | 2019197211 | A | 11/2019 |
| JP | 2020046481 | A | 3/2020 |
| JP | 2020177151 | A | 10/2020 |
| JP | 2022000680 | A | 1/2022 |

* cited by examiner

FIG. 5A

STATES OF CONTACT WITH/SEPARATION FROM PHOTOSENSITIVE DRUM

| TARGET MEMBER | NORMAL MODE | | WIDE COLOR GAMUT MODE | |
|---|---|---|---|---|
| | FOR SINGLE-COLOR | FOR MULTICOLOR | FOR SINGLE-COLOR | FOR MULTICOLOR |
| DEVELOPING ROLLER 3K | IN CONTACT | IN CONTACT | IN CONTACT | IN CONTACT |
| PRIMARY TRANSFER ROLLER 6K | IN CONTACT | IN CONTACT | IN CONTACT | IN CONTACT |
| DEVELOPING ROLLERS 3Y, 3M, 3C | SEPARATED | IN CONTACT | SEPARATED | IN CONTACT |
| PRIMARY TRANSFER ROLLERS 6Y, 6M, 6C | SEPARATED | IN CONTACT | SEPARATED | IN CONTACT |

FIG. 5B

STATES OF CONTACT WITH/SEPARATION FROM PHOTOSENSITIVE DRUM

| TARGET MEMBER | WIDE COLOR GAMUT MODE (FOR SINGLE-COLOR) | |
|---|---|---|
| | SETTING 1 | SETTING 2 |
| DEVELOPING ROLLER 3K | IN CONTACT | IN CONTACT |
| PRIMARY TRANSFER ROLLER 6K | IN CONTACT | IN CONTACT |
| DEVELOPING ROLLERS 3Y, 3M, 3C | SEPARATED | IN CONTACT |
| PRIMARY TRANSFER ROLLERS 6Y, 6M, 6C | SEPARATED | IN CONTACT |

IMAGE FORMING APPARATUS

CROSS-REFERENCE TO RELATED APPLICATIONS

The present application is a continuation of U.S. patent application Ser. No. 18/324,866, filed on May 26, 2023, which claims priority from Japanese Patent Application No. 2022-091072, filed Jun. 3, 2022, which are hereby incorporated by reference herein in their entireties.

BACKGROUND

Field

The present disclosure generally relates to image forming and, more particularly, to an electrophotographic image forming apparatus.

Description of the Related Art

A color gamut is one of the output image quality indices in an electrophotographic image forming apparatus, such as a laser beam printer. The color gamut represents a range of colors that the image forming apparatus can reproduce (a color reproduction range). Japanese Patent Laid-Open No. 2017-173465 discloses an electrophotographic image forming apparatus capable of forming an image in a mode (a wide color gamut mode) in which a color reproduction range of an image to be formed on a printing material is expanded. In the wide color gamut mode of Japanese Patent Laid-Open No. 2017-173465, the color reproduction range is expanded by increasing an amount of toner per unit area to be carried by a photosensitive drum by setting a peripheral speed (rotational speed) of a developing roller to be fast relative to a peripheral speed of the photosensitive drum.

Normally, an image forming apparatus including the wide color gamut mode as described above uses image forming conditions that are similar to those for when forming a multicolor image (such as a full-color image), even when forming a single-color image (such as a black single-color image) in the wide color gamut mode. However, the use of such image forming conditions when forming a single-color image in the wide color gamut mode does not necessarily meet the needs of a user. For example, there may be a demand for allowing output of an image of higher quality and density by applying image forming conditions that are suitable for forming a black single-color image.

SUMMARY

The present disclosure provides a technique for obtaining an output image of higher quality and density when outputting a single-color image in an image forming mode in which a color gamut of the output image is expanded from what is normal.

Some embodiments provide an image forming apparatus including a first image forming unit including a first image bearing member and a first developing unit configured to form a toner image by developing an electrostatic latent image formed on the first image bearing member; a second image forming unit including a second image bearing member and a second developing unit configured to form a toner image by developing an electrostatic latent image formed on the second image bearing member; and a control unit configured to control the first image forming unit and the second image forming unit, wherein the control unit performs control so as to allow execution of a first mode and a second mode in which a color gamut of an image to be formed on a printing material is expanded from the first mode, as an image forming mode for forming an image on a printing material, and the second mode includes a second single-color mode in which image formation is performed by only the first image forming unit and a second multicolor mode in which image formation is performed by the first image forming unit and the second image forming unit.

Further features of the present disclosure will become apparent from the following description of exemplary embodiments (with reference to the attached drawings).

BRIEF DESCRIPTION OF THE DRAWINGS

FIGS. 5A and 5B illustrate examples of driving conditions for the image forming units in each of the image forming modes.

DESCRIPTION OF THE EMBODIMENTS

Figure 1:
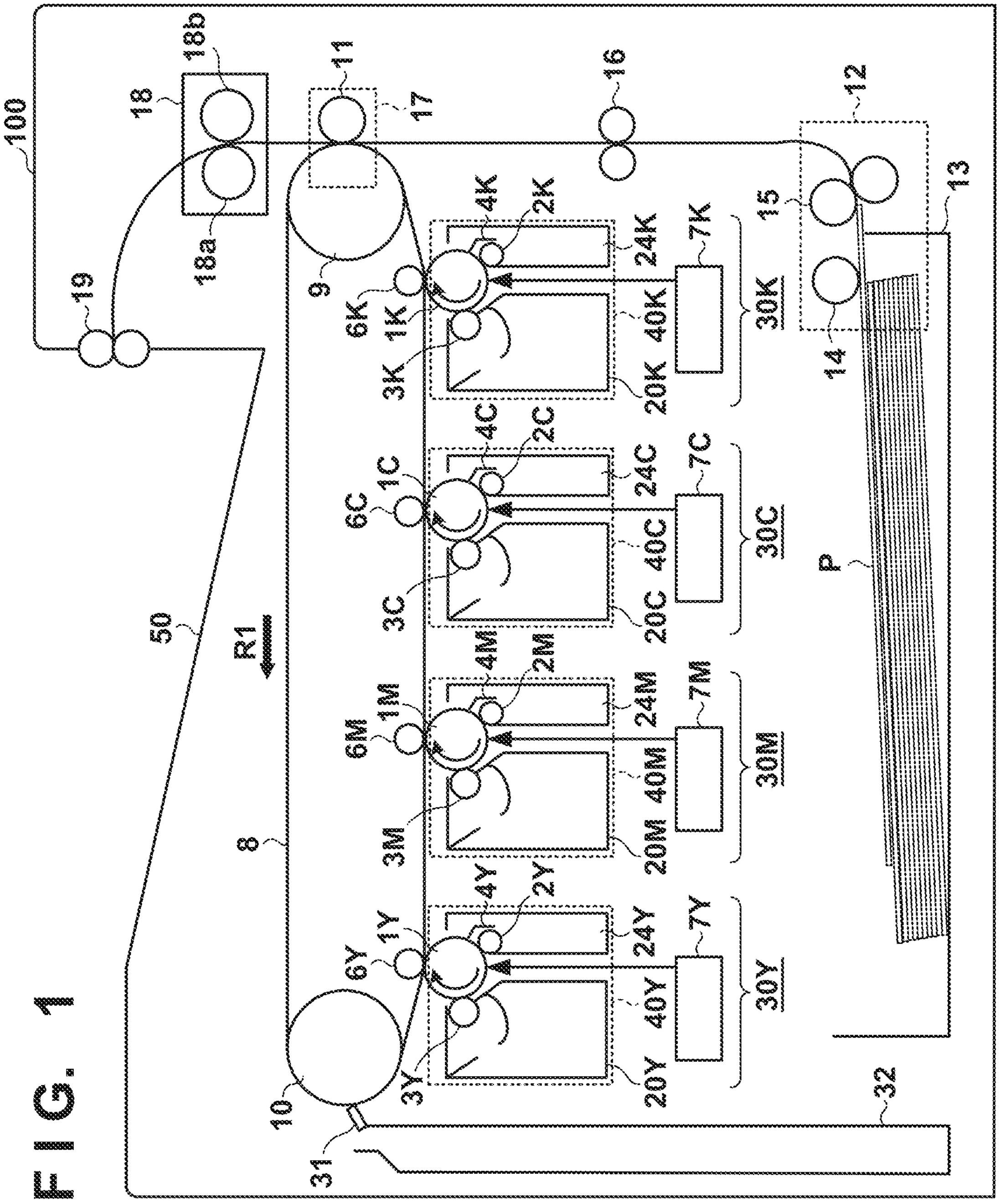
FIG. 1 is a cross-sectional diagram illustrating an example of a hardware configuration of an image forming apparatus.

Hereinafter, various exemplary embodiments, features, and aspects will be described in detail with reference to the attached drawings. Note, the following embodiments are not intended to limit the scope of the claimed invention. Multiple features are described in the embodiments, but limitation is not made to embodiments that use all such features, and multiple such features may be combined as appropriate. Furthermore, in the attached drawings, the same reference numerals are given to the same or similar configurations, and redundant description thereof is omitted.

First Embodiment

An electrophotographic laser beam printer will be described as an example of an image forming apparatus. However, the image forming apparatus is not limited to only a laser beam printer and may be another type of image forming apparatus, such as a printer, a copy machine, a facsimile machine, a microfilm reader printer, and a recording machine.

<Configuration of Image Forming Apparatus>

In a first embodiment, an image forming apparatus including as image forming modes for forming an image on a printing material a normal mode (first mode) and a wide color gamut mode (second mode) in which a color gamut of an image to be formed on a printing material is expanded from a normal mode will be described. An image forming apparatus according to the present embodiment includes as the wide color gamut mode a single-color wide color gamut mode (second single-color mode) for forming a single-color image and a multicolor wide color gamut mode (second multicolor mode) for forming a multicolor image. In the single-color wide color gamut mode (second single-color mode), the image forming apparatus is configured to form a toner image only in a first image forming unit corresponding to a first color (K color) among a plurality of image forming units, each for forming a toner image of a different color. In the following, an example of such an image forming apparatus will be described in detail.

FIG. 1 is a cross-sectional diagram illustrating an example of a hardware configuration of an image forming apparatus 100 according to the first embodiment. The image forming apparatus 100 is configured to form an image on a printing material with an electrophotographic method. The image forming apparatus 100 is configured as an in-line laser beam printer employing an intermediate transfer method and is capable of forming a full-color image. The image forming apparatus 100 uses an intermediate transfer belt as an intermediate transfer member. The image forming apparatus may be configured as a laser beam printer employing a direct transfer method in which a toner image is transferred from a photosensitive member (photosensitive drum) to a printing material without going through the intermediate transfer member (intermediate transfer belt). The printing material on which an image is to be formed may be referred to as a sheet, printing paper, a printing medium, paper, a transfer material, transfer paper, and the like.

The image forming apparatus 100 includes image forming units 30Y, 30M, 30C, and 30K as a plurality of image forming units, each for forming an image (toner image) of a different color. The image forming units 30Y, 30M, 30C, and 30K are sequentially arranged in a line from an upstream side to a downstream side in a direction R1 of movement of a surface of an intermediate transfer belt 8 for carrying toner images. The image forming units 30Y, 30M, 30C, and 30K each form an image using toner of their respective colors, yellow, magenta, cyan, and black. The image forming units 30Y, 30M, 30C, and 30K have the same configuration. The characters, Y, M, C, and K, attached to the reference numerals indicate toner colors, yellow (Y color), magenta (M color), cyan (C color), and black (K color), and are omitted when matters common to each of the colors are described.

The image forming units 30 each include a process cartridge 40 capable of being attached to and detached from the image forming apparatus 100. The process cartridge 40 includes a photosensitive drum 1, a charging roller 2, a developing unit 20 including a developing roller 3, a cleaning blade 4, and a waste toner container 24. The developing unit 20 includes the developing roller 3. The image forming units 30 each further include a primary transfer roller 6 and a laser unit 7. The primary transfer roller 6 is arranged at a position on an inner side of the intermediate transfer belt 8, opposing the photosensitive drum 1 via the intermediate transfer belt 8. The laser unit 7 is arranged below the process cartridge 40.

The photosensitive drum 1 is an image bearing member for carrying an electrostatic latent image and a toner image formed by developing the electrostatic latent image with toner. The photosensitive drum 1 is driven to rotate at a predetermined peripheral speed in a direction of an arrow (clockwise direction) illustrated in FIG. 1.

The charging roller 2 uniformly charges a surface of the photosensitive drum 1 by a voltage applying unit (voltage applying unit 401 or 402 of FIG. 4) applying a predetermined charging voltage. The laser unit 7 forms an electrostatic latent image on the surface of the photosensitive drum 1 by exposing the photosensitive drum 1 based on an image signal (image data). The developing roller 3 forms a toner image on the photosensitive drum 1 by developing the electrostatic latent image formed on the photosensitive drum 1 using developer (toner) supplied from a toner container in the developing unit 20. Specifically, the toner on the developing roller 3 moves onto and adheres to the photosensitive drum 1 by a voltage applying unit (voltage applying unit 411 of FIG. 4) applying a predetermined developing voltage to the developing roller 3. Thus, the electrostatic latent image on the photosensitive drum 1 is developed into a toner image.

In the present embodiment, the photosensitive drum 1 is an example of an image bearing member (photosensitive member), and the developing roller 3 is an example of a developing unit for forming a toner image on the image bearing member by developing an electrostatic latent image formed on the image bearing member with toner. The primary transfer roller 6 is an example of a primary transfer unit for transferring the toner image formed on a corresponding image bearing member to the intermediate transfer member.

The image forming apparatus 100 includes the flexible, endless belt-like intermediate transfer belt 8, which is arranged at a position opposing each of the photosensitive drums 1. The intermediate transfer belt 8 is stretched over a driving roller 9 for rotating the intermediate transfer belt 8 and a driven roller 10 for applying appropriate tension to the intermediate transfer belt 8. The intermediate transfer belt 8 is rotationally driven in a direction of an arrow R1 (counterclockwise direction) while contacting the photosensitive drums 1 by a driving motor (not illustrated) transmitting a driving force to the driving roller 9. The intermediate transfer belt 8 moves at a speed corresponding to a peripheral speed of the photosensitive drums 1.

The primary transfer rollers 6 are arranged on the inner side of the intermediate transfer belt 8 as transfer members, each for transferring a toner image from the photosensitive drum 1 to the intermediate transfer belt 8. The toner images formed on their respective photosensitive drums 1 are transferred onto the intermediate transfer belt 8 at their respective transfer positions (primary transfer portions) by voltage applying units (voltage applying units 421 and 422 of FIG. 4) each applying a primary transfer voltage to their respective primary transfer rollers 6. For example, negative toner images are transferred from their respective photosensitive drums 1 to the intermediate transfer belt 8 by a positive voltage being applied to the intermediate transfer belt 8 via the primary transfer rollers 6. At that time, the toner images of four colors, the Y color, the M color, the C color, and the K color, formed on their respective photosensitive drums 1Y, 1M, 1C, and 1K are sequentially transferred so as to be overlapped on the intermediate transfer belt 8.

The toner images formed on the intermediate transfer belt 8 are conveyed to a secondary transfer portion 17, which is a point of contact between the intermediate transfer belt 8 and a secondary transfer roller 11, according to the rotation of the intermediate transfer belt 8. At the secondary transfer portion 17, the toner images on the intermediate transfer belt 8 are transferred to a printing material P conveyed from a printing material cassette 13 along a conveyance path. As described above, the intermediate transfer belt 8 of the present embodiment is an example of the intermediate transfer member (transfer-receiving member) to which the toner images formed on the respective image bearing members (photosensitive drums 1) of the plurality of image forming units 30 are transferred so as to be overlapped, and the toner images transferred to the intermediate transfer member are transferred to a printing material.

The printing material cassette 13 stores sheet-like printing materials P in a state in which they are stacked. A feeding and conveyance apparatus 12 includes a paper feeding roller 14 and a pair of conveyance rollers 15. The paper feeding roller 14 is configured to feed a printing material P from the printing material cassette 13 to the conveyance path. The pair of conveyance rollers 15 are configured to convey the printing material P fed to the conveyance path toward a pair of registration rollers 16. The printing material P conveyed to the pair of registration rollers 16 is conveyed to the secondary transfer portion 17 by the pair of registration rollers 16 at a speed corresponding to a rotational speed of the intermediate transfer belt 8 at a predetermined control timing. The toner images on the intermediate transfer belt 8 are transferred onto the printing material P at the secondary transfer portion 17 by a voltage applying unit (voltage applying unit 431 of FIG. 4) applying a secondary transfer voltage to the secondary transfer roller 11. For example, negative toner images are transferred from the intermediate transfer belt 8 to the printing material P by a positive voltage being applied to the printing material P via the secondary transfer roller 11.

The printing material P to which the toner image has been transferred at the secondary transfer portion 17 is conveyed to a fixing unit 18. The fixing unit 18 includes a fixing roller 18*a*, which is a heating member, and a pressing roller 18*b*, which is a pressing member and is arranged opposing the fixing roller 18*a*. The fixing unit 18 performs fixing processing for fixing the transferred toner images to the printing material P by applying heat and pressure to the printing material P while the printing material P passes through a point of contact between the fixing roller 18*a* and the pressing roller 18*b*. The printing material P on which the fixing processing has been performed is discharged onto a discharge tray 50 by a pair of discharging rollers 19.

Toner remaining on the surfaces of the photosensitive drums 1 after the transfer of the toner images from the photosensitive drums 1 to the intermediate transfer belt 8 is removed by cleaning blades 4. The cleaning blades 4 each collect the toner on the photosensitive drum 1 into a waste toner container 24 while being in contact with the photosensitive drum 1. Further, toner remaining on the surface of the intermediate transfer belt 8 after the transfer of toner images from the intermediate transfer belt 8 to the printing material P and paper dust transferred from the printing material P to the intermediate transfer belt 8 during the transfer are removed by a cleaning blade 31. The cleaning blade 31 collects the toner and paper dust on the intermediate transfer belt 8 into a waste toner container 32 while being in contact with the intermediate transfer belt 8.

Figure 2:
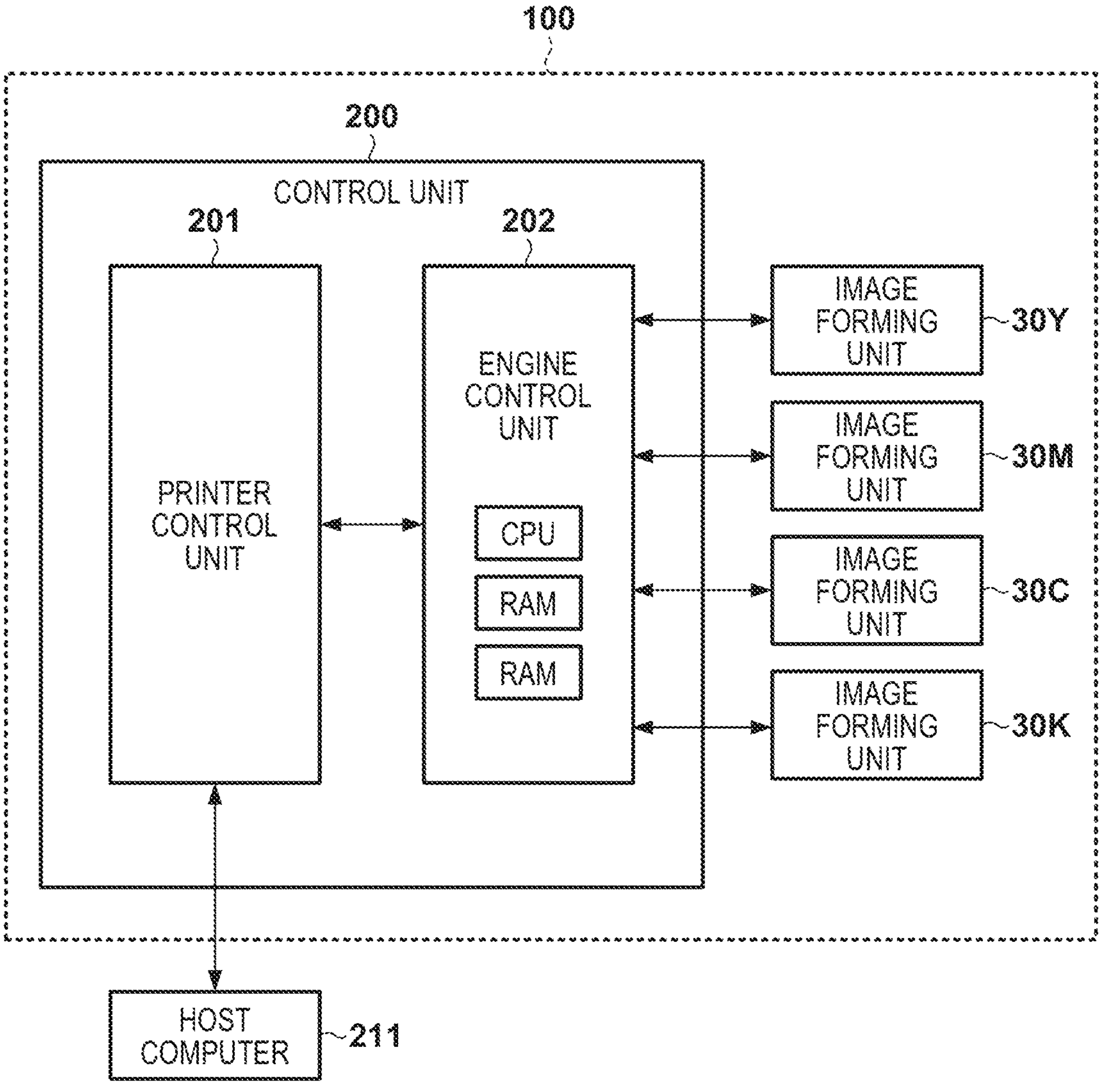
FIG. 2 is a block diagram illustrating an example of a schematic control configuration of the image forming apparatus.

FIG. 2 is a block diagram illustrating an example of a schematic control configuration of the image forming apparatus 100. The image forming apparatus 100 includes a control unit 200 for controlling the operation of the entire apparatus. The control unit 200 includes a printer control unit 201 and an engine control unit 202.

The printer control unit 201 communicates with a host computer 211 (external apparatus). When a print job is received from the host computer 211, the printer control unit 201 expands printing data included in the print job into image data that can be used for image formation. The printer control unit 201 includes a function for performing image processing, such as character code bitmapping processing or image halftoning processing, on image data received from the host computer 211. The printer control unit 201 transmits the expanded image data to the engine control unit 202.

The engine control unit 202 communicates with the printer control unit 201, for example, by serial communication and controls the image forming units 30Y, 30M, 30C, and 30K. When image data is received from the printer control unit 201, the engine control unit 202 controls the image forming units 30Y, 30M, 30C, and 30K to perform an image forming operation for forming an image on a printing material P based on the received image data.

The engine control unit 202 includes a central processing unit (CPU), a read-only memory (ROM), and a random access memory (RAM). The ROM is a non-volatile storage apparatus storing a program, such as a control program for controlling the operation of the image forming apparatus 100. The RAM is a volatile storage apparatus used as a temporary storage region for programs and data and as a working region for the CPU. The CPU includes one or more processors, circuitry, or combinations thereof, and controls the operation of each of the devices (such as the image forming units 30) of the image forming apparatus 100 by reading out a program stored in the ROM to the RAM and executing the program. As described above, the engine control unit 202 (or the control unit 200) of the present embodiment is an example of a control unit for controlling the first image forming unit and a second image forming unit. In the present embodiment, the image forming unit 30K is an example of the first image forming unit, and the image forming units 30M, 30C, and 30K are each an example of the second image forming unit.

<Driving Configuration>

Figure 3:
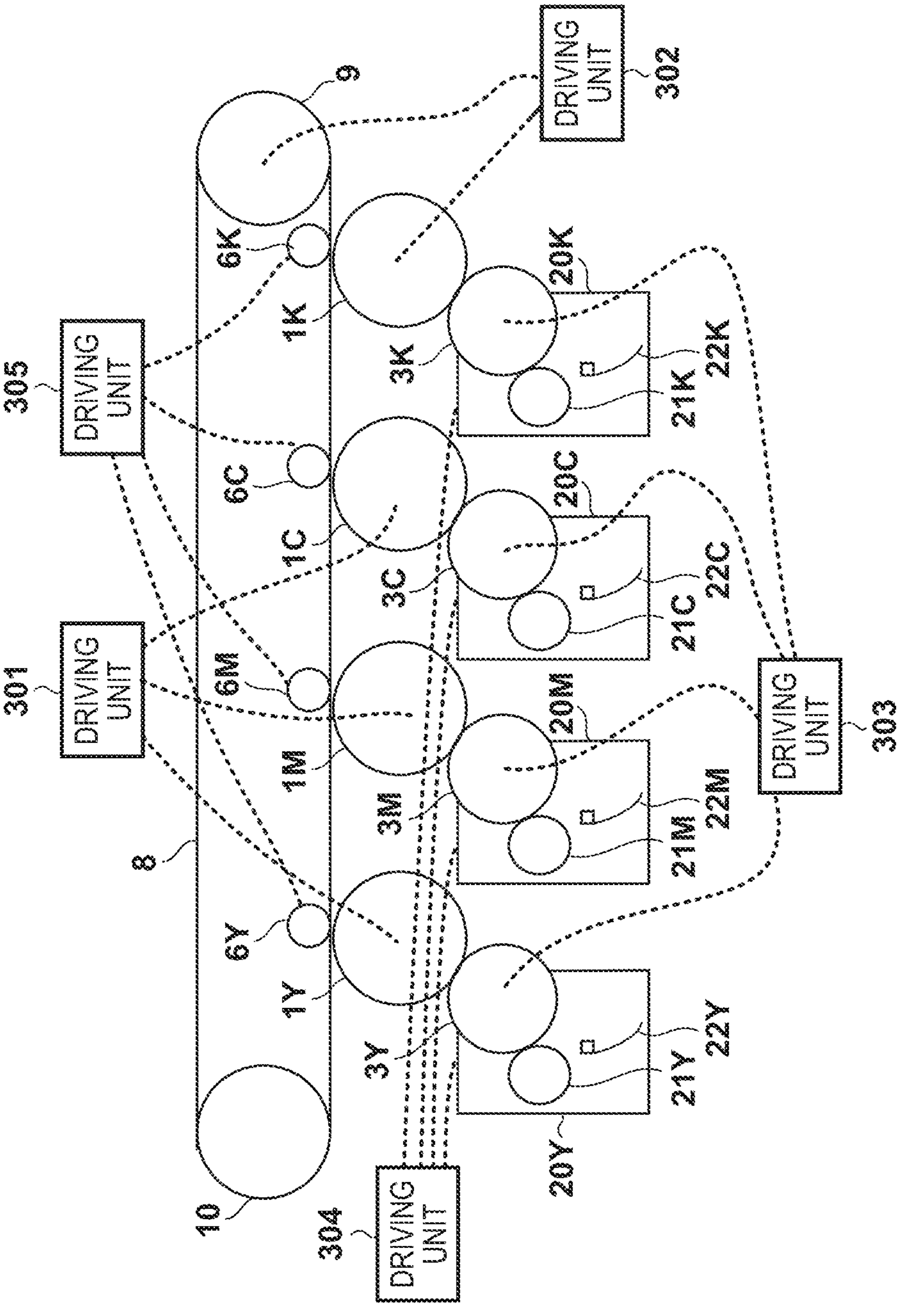
FIG. 3 is a schematic diagram illustrating an example of a driving configuration of image forming units and an intermediate transfer belt.

FIG. 3 is a schematic diagram illustrating an example of a driving configuration of the image forming units 30 and the intermediate transfer belt 8 in the image forming apparatus 100 of the present embodiment. The image forming apparatus 100 includes driving units 301 to 305. The operation of the driving units 301 to 305 is controlled by the engine control unit 202. The developing unit 20 of each image forming unit 30 includes the developing roller 3, a supply roller 21, and a stirring member 22. The stirring member 22 is configured to stir the toner in the toner container of the developing unit 20 by being driven to rotate. The supply roller 21 is configured to supply the toner in the toner container to the developing roller 3 by being driven to rotate.

The photosensitive drums 1Y, 1M, and 1C are driven to rotate by the driving unit 301. The driving unit 301 includes a driving motor (first driving source) and a series of gears for transmitting a driving force from the driving motor. The photosensitive drum 1K is driven to rotate by the driving unit 302. The driving unit 302 includes a driving motor (second driving source). The driving unit 302 is further configured to rotate (circulatingly move) the intermediate transfer belt 8 by driving the driving roller 9 for the intermediate transfer belt 8.

The developing rollers 3Y, 3M, 3C, and 3K are driven to rotate by the driving unit 303. The driving unit 303 includes a driving motor (third driving source) and a series of gears for transmitting a driving force from the driving motor. Although not illustrated in FIG. 3, the driving unit 303 is further configured to rotationally drive a rotational shaft of each of the stirring members 22Y, 22M, 22C, and 22K via another series of gears.

The image forming apparatus 100 includes the driving unit 304 for switching a state of each developing roller 3 between a contact state in which the roller is in contact with the corresponding photosensitive drum 1 and a separated state in which the roller is separated from the photosensitive drum 1. The driving unit 304 includes a driving motor (fourth driving source), a series of gears for transmitting a driving force from the driving motor, and a clutch. The engine control unit 202 can individually switch each developing roller 3 between a state of contact with and a state of separation from the corresponding photosensitive drum 1 by using the driving unit 304 (developing contact and separation mechanism).

The image forming apparatus 100 includes the driving unit 305 for switching a state of each primary transfer roller 6 between a contact state in which the roller is in contact with the corresponding photosensitive drum 1 via the intermediate transfer belt 8 and a separated state in which the roller is separated from the photosensitive drum 1. The driving unit 305 includes a driving motor (fifth driving source), a series of gears for transmitting a driving force from the driving motor, and a clutch. The engine control unit 202 can individually switch each primary transfer roller 6 between a state of contact with and a state of separation from the corresponding photosensitive drum 1 by using the driving unit 305. Although not illustrated in FIG. 3, the driving unit 305 is further configured to drive the fixing roller 18*a*.

When the photosensitive drum 1 and the developing roller 3 are driven by the same driving source (driving motor) via a series of gears, a ratio of peripheral speeds between the photosensitive drum 1 and the developing roller 3 is fixed to a value determined by a gear ratio of gears corresponding to each of them. In contrast, the image forming apparatus 100 of the present embodiment is configured such that the photosensitive drum 1 and the developing roller 3 are each driven by a different driving source (driving motor) in each of the image forming units 30. Thus, the ratio of peripheral speeds between the photosensitive drum 1 and the developing roller 3 in each of the image forming units is variable.

<Voltage Application Configuration>

Figure 4:
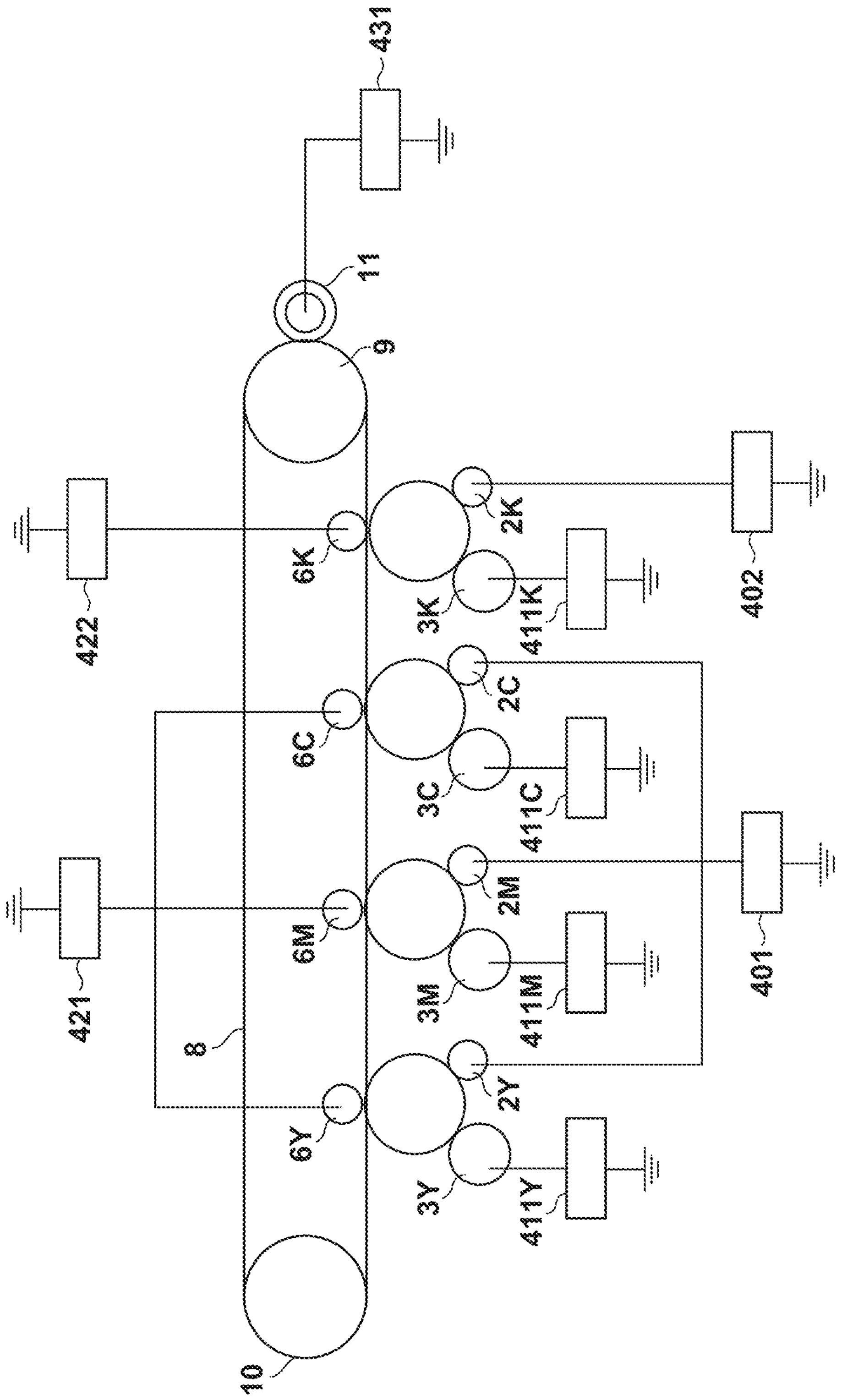
FIG. 4 is a schematic diagram illustrating an example of a voltage application configuration in the image forming apparatus.

FIG. 4 is a schematic diagram illustrating an example of a voltage application configuration in the image forming apparatus 100 of the present embodiment. As illustrated in FIG. 4, the image forming apparatus 100 includes the voltage applying units 401, 402, 411 (411Y, 411M, 411C, and 411K), 421, 422, and 431, and the voltage applying units each include a high-voltage power supply. The voltage application (power supply) from each of the voltage applying units in the image forming apparatus 100 is controlled by the engine control unit 202.

The voltage applying units 401 and 402 are each configured to generate a charging voltage by a high-voltage power supply and apply the charging voltage to their respective charging rollers 2. The voltage applying unit 401 is provided in common to the image forming units 30Y, 30M, and 30C and is configured to apply a charging voltage to each of the charging rollers 2Y, 2M, and 2C. The voltage applying unit 402 is provided for the image forming unit 30K and is configured to apply a charging voltage to the charging roller 2K of the image forming unit 30K.

The voltage applying units 411Y, 411M, 411C, and 411K are each configured to generate a developing voltage by a high-voltage power supply and apply the developing voltage to their respective developing rollers 3. The voltage applying units 411Y, 411M, 411C, and 411K are provided for the image forming units 30Y, 30M, 30C, and 30K, respectively, and are each configured to apply a developing voltage to their respective developing rollers 3Y, 3M, 3C, and 3K.

The voltage applying units 421 and 422 are each configured to generate a primary transfer voltage by a high-voltage power supply and apply the primary transfer voltage to their respective primary transfer rollers 6. The voltage applying unit 421 is provided in common to the image forming units 30Y, 30M, and 30C and is configured to apply a primary transfer voltage to each of the primary transfer rollers 6Y, 6M, and 6C. The voltage applying unit 422 is provided for the image forming unit 30K and is configured to apply a primary transfer voltage to the primary transfer roller 6K of the image forming unit 30K. A power supply separate for each of the image forming units or a power supply common to all of the image forming units may be provided for applying a primary transfer voltage.

The voltage applying unit 431 is configured to generate a secondary transfer voltage by a high-voltage power supply and apply the secondary transfer voltage to the secondary transfer roller 11. The image forming apparatus 100 may be configured to apply a voltage outputted from the voltage applying unit 431 to each of the primary transfer rollers 6 as a primary transfer voltage via the intermediate transfer belt 8 without the above-described voltage applying units 421 and 422 being provided.

<Normal Mode and Wide Color Gamut Mode>

As described above, the image forming apparatus 100 of the present embodiment has a driving configuration in which the photosensitive drum 1 and the developing roller 3 can be driven at individual rotational speeds for each image forming unit. Using such a driving configuration, the image forming apparatus 100 (engine control unit 202) includes as image forming modes the normal mode (first mode) and the wide color gamut mode (second mode) in which a color gamut of an image (output image) to be formed on a printing material is expanded from that of the normal mode. The color gamut represents a range of colors that an image forming apparatus can reproduce (a color reproduction range) when forming an image on a printing material. The normal mode is an image forming mode for obtaining a normal density as a density of an output image. As will be described later, the image forming apparatus 100 of the present embodiment includes a single-color mode and a multicolor (full-color) mode for each of the normal mode and the wide color gamut mode.

The wide color gamut mode has image forming conditions that are different from those of the normal mode. In the wide color gamut mode, the ratio of peripheral speeds between the photosensitive drum 1 and the developing roller 3 is changed from the ratio of peripheral speeds in the normal mode. Here, the ratio of peripheral speeds between the photosensitive drum 1 and the developing roller 3 is a ratio of the peripheral speed (rotational speed) of the developing roller 3 to the peripheral speed (rotational speed) of the photosensitive drum 1. Specifically, in the wide color gamut mode, the engine control unit 202 sets for each image forming unit the ratio of peripheral speeds between the photosensitive drum 1 and the developing roller 3 to be higher than the ratio of peripheral speeds in the normal mode. An operation for thus rotating the photosensitive drum 1 and the developing roller 3 at a ratio of peripheral speeds higher than that in the normal mode corresponds to an operation for increasing an amount of toner per unit area supplied from the developing roller 3 to the photosensitive drum 1 (a toner supply capability) from that in the normal mode.

Further, in the wide color gamut mode, a developing contrast may be changed from a developing contrast in the normal mode. Here, the developing contrast is a potential difference (an absolute value of a difference) between a potential of an exposed portion (image portion) (a light portion potential) on the surface of the photosensitive drum 1 and a potential of the developing roller 3. Specifically, in the wide color gamut mode, the engine control unit 202 sets for each image forming unit the developing contrast for developing an electrostatic latent image to be formed on the photosensitive drum 1 with toner to be greater than the developing contrast in the normal mode. Thus, for example, the maximum amount of toner that can be adhered to the developing roller 3 is used for developing the electrostatic latent image. An operation for thus increasing the developing contrast from that in the normal mode corresponds to the operation for increasing the amount of toner per unit area supplied from the developing roller 3 to the photosensitive drum 1 (the toner supply capability) than that in the normal mode.

By increasing the amount of toner per unit area supplied from the developing roller 3 to the photosensitive drum 1 as described above, a wide color gamut mode in which a color gamut of an image (output image) to be formed on a printing material is expanded from that in the normal mode can be realized. Tables 1A and 1B indicate examples of settings for image forming conditions in the normal mode and the wide color gamut mode. Table 1A indicates an example of settings for various processing speeds and the ratio of peripheral speeds between the photosensitive drum 1 and the developing roller 3, and Table 1B indicates an example of settings for various potentials and the developing contrast.

TABLE 1A

| | PROCESSING SPEED [mm/s] | | | |
|---|---|---|---|---|
| IMAGE FORMING MODE | INTERMEDIATE TRANSFER BELT AND PRINTING MATERIAL | PHOTO-SENSITIVE DRUM | DEVEL-OPING ROLLER | RATIO OF PERIPH-ERAL SPEEDS |
| NORMAL MODE | 321 | 321 | 289 | 90% |
| WIDE COLOR GAMUT MODE | 112 | 112 | 129 | 115% |

TABLE 1B

| | DEVELOPING CONDITION [−V] | | | |
|---|---|---|---|---|
| IMAGE FORMING MODE | DARK PORTION POTEN-TIAL (Vd) | LIGHT PORTION POTEN-TIAL (Vl) | DEVEL-OPING ROLLER POTEN-TIAL (Vdev) | DEVEL-OPING CONTRAST (\|Vdev − Vl\|) |
| NORMAL MODE | 550 | 130 | 400 | 270 |
| WIDE COLOR GAMUT MODE | 700 | 150 | 450 | 300 |

In the example indicated in Table 1A, the ratio of peripheral speeds between the photosensitive drum 1 and the developing roller 3 in the wide color gamut mode is set to be 1.28 times (≈115/90) the ratio of peripheral speeds in the normal mode. By thus increasing the ratio of peripheral speeds in the wide color gamut mode from the ratio of peripheral speeds in the normal mode, the amount of toner supplied per unit time from the developing roller 3 to the photosensitive drum 1 can be increased compared to that of the normal mode. A method of changing the ratio of peripheral speeds between the photosensitive drum 1 and the developing roller 3 is not limited to this. For example, a method of changing the ratio of peripheral speeds by fixing a linear speed of the photosensitive drum 1 and increasing a linear speed of the developing roller 3 may be used.

In the example indicated in Table 1B, the developing contrast in the wide color gamut mode is set to be greater than the developing contrast in the normal mode. The setting is intended for allowing the maximum amount of toner that can be adhered to the developing roller 3 being used in developing an electrostatic latent image. Specifically, in the normal mode, a potential of the charging roller 2 is set to V0=−1100 [V], a dark portion potential (potential of a non-image portion) on the photosensitive drum 1 after charging is set to Vd=−550 [V], a light portion potential (potential of an image portion) on the photosensitive drum 1 after charging is set to V1=−130 [V], and a potential of the developing roller 3 is set to Vdev=−400 [V]. Thus, the developing contrast (=|Vdev−V1|) becomes 270 [V]. Meanwhile, in the wide color gamut mode, the setting is performed such that V0=−1250 [V], Vd=−700 [V], Vl=−150 [V], and Vdev=−450 [V]. Thus, the developing contrast becomes 400 [V] and greater than that of the normal mode.

Further, in the wide color gamut mode, the potential difference between the dark portion potential Vd and the light portion potential Vl is set to be greater than that of the normal mode in order to improve the reproducibility of a fine line. That is, in the wide color gamut mode, the engine control unit 202 sets for each image forming unit the potential difference between the dark portion potential Vd and the light portion potential Vl on the photosensitive drum 1 on which an electrostatic latent image is formed to be greater than the potential difference in the normal mode. This makes it possible to improve the reproducibility of a fine line in an output image in the wide color gamut mode. In the image forming apparatus 100 of the present embodiment, it is possible to provide as image forming modes a plurality of image forming modes, each with a different potential difference (that is, the potential difference between the light portion potential and the dark portion potential) of an electrostatic latent image.

<Single-Color Wide Color Gamut Mode>

Next, a case where a single-color image (such as a black (K color) single-color image) is formed on a printing material in the wide color gamut mode in the image forming apparatus 100 will be described. As will be described below, the image forming apparatus 100 of the present embodiment includes a wide color gamut mode (multicolor wide color gamut mode) as described above and a wide color gamut mode (single-color wide color gamut mode) suitable for when forming a single-color image on a printing material (that is, suitable for forming a single-color image).

Normally, an image forming apparatus including a wide color gamut mode as described above uses image forming conditions that are similar to those for when forming an image of a plurality of colors (multicolor) (a multicolor image), such as a full-color image, even when forming a K single-color image in the wide color gamut mode. That is, image forming conditions (such as a transfer setting) corresponding to the amount of toner for expanding a color gamut of an image to be formed on the printing material is used in each of the image forming units 30Y, 30M, 30C, and 30K.

However, the use of such image forming conditions when forming a single-color image in the wide color gamut mode does not necessarily meet the needs of a user. For example, there is a demand for allowing output of an image of higher quality and density by applying image forming conditions that are suitable for forming a black single-color image (are for forming a black single-color). Thus allowing output of an image of higher quality and density when forming a single-color image in the wide color gamut mode has, for example, the following problems.

For example, normally, transfer setting is performed in an image forming apparatus employing an intermediate transfer method so as to prevent a toner image transferred to the intermediate transfer belt in an image forming unit that is upstream in the direction of movement of the intermediate transfer belt from being retransferred to a photosensitive drum in an image forming unit that is downstream in the direction of movement of the intermediate transfer belt. Therefore, it is difficult to perform unique transfer setting only for the image forming unit corresponding to the K color so as to generate at a primary transfer portion an electric field of an intensity suitable for forming a K single-color image.

A decrease in transfer efficiency may occur due to a charge of a toner image being reversed by an electric field of excess intensity occurring at the secondary transfer portion.

In the fixing unit, when excess heat is supplied by the heating member, a decrease in gloss or density in an output image may occur due to occurrence of a toner offset in which a part of the toner image adheres to the heating member.

When an image in which a ratio of an area covered by toner to the entire output image is low is formed as a K single-color image (monochrome image) using the wide color gamut mode for forming a multicolor image, a defined single-color image cannot be obtained. This is due to the effect of the color cast toner caused by primary transfer of a toner image from the photosensitive drum 1 being possible in the plurality of image forming units.

In the image forming units 30 corresponding to their respective toner colors other than the K color, the developing units 20 (the developing rollers 3) are driven even though development of electrostatic latent images using toner is not performed. This leads to shortening of lives of the developing units corresponding to their respective toner colors other than the K color.

Accordingly, in order to address one or more of the above-described problems, the image forming apparatus 100 of the present embodiment includes the single-color wide color gamut mode (second single-color mode) suitable for forming a single-color image. In the single-color wide color gamut mode, the engine control unit 202 causes only the image forming unit 30K (first image forming unit) corresponding to the K color (first color) to form an image among the plurality of image forming units 30. In the present embodiment, when a single-color image (K single-color image) for which a color gamut is expanded from what is normal is formed, it becomes possible to form an image according to image forming conditions for forming a single-color image by using the single-color wide color gamut mode. This makes it possible to output a single-color image of higher quality and density.

Specifically, the engine control unit 202 controls the image forming units 30 according to driving conditions illustrated in FIG. 5A. In the single-color wide color gamut mode, the engine control unit 202 controls the driving unit 304 so as to bring the developing roller 3K into contact with the photosensitive drum 1K while separating the developing rollers 3Y, 3M, and 3C from the photosensitive drums 1Y, 1M, and 1C, respectively. In this state, the engine control unit 202 controls an image forming operation performed by the image forming units 30 so as to form a K single-color image using the image forming unit 30K and transfer the K single-color image onto a printing material P. In the single-color wide color gamut mode, the engine control unit 202 further controls the driving unit 305 so as to bring the primary transfer roller 6K into contact with the photosensitive drum 1K via the intermediate transfer belt 8 while separating the primary transfer rollers 6Y, 6M, and 6C from the photosensitive drums 1Y, 1M, and 1C, respectively.

In the single-color wide color gamut mode, the engine control unit 202 thus brings the developing roller 3K of the image forming unit 30K into contact with the corresponding photosensitive drum 1K and separates the developing rollers 3 of the image forming units 30 other than that of the image forming unit 30K from the corresponding photosensitive drums 1. Further, in the single-color wide color gamut mode, the engine control unit 202 brings the primary transfer roller 6K of the image forming unit 30K into contact with the photosensitive drum 1K via the intermediate transfer belt 8 and separates the primary transfer rollers 6 of the image forming units 30 other than that of the image forming unit 30K from the corresponding photosensitive drums 1. This makes it possible to set image forming conditions (such as a transfer setting) for forming a single-color image (K single-color image), allowing output of an image of higher quality and density.

As illustrated in FIG. 5A, the image forming apparatus 100 may include a single-color normal mode and a multicolor normal mode also for the normal mode. In this case, in the single-color normal mode, the engine control unit 202 controls states of contact with and separation from the photosensitive drum 1 for the developing rollers 3 and the primary transfer rollers 6 similarly to in the multicolor wide color gamut mode. This makes it possible to set image forming conditions (such as transfer setting) for forming a single-color image (K single-color image) even in the normal mode.

<Transfer Current Settings>

In the image forming apparatus 100 of the present embodiment, in the single-color wide color gamut mode (second single-color mode), the engine control unit 202 controls the image forming unit 30K (first image forming unit) to form an image according to image forming conditions for forming a single-color image. This makes it possible to output an image of higher quality and density when forming a single-color image in the wide color gamut mode. Here, transfer current settings will be further described with reference to Table 2 below as settings for image forming conditions in the image forming apparatus 100 according to the present embodiment. Table 2 indicates an example of settings for transfer conditions (target transfer currents) in each of the image forming mode.

TABLE 2

| IMAGE FORMING MODE | | TARGET TRANSFER CURRENT VALUE [mA] PRIMARY TRANSFER PORTION | SECONDARY TRANSFER PORTION |
|---|---|---|---|
| NORMAL MODE | FOR SINGLE-COLOR | 16.5 | 23.2 |
| | FOR MULTICOLOR | 15 | 29 |

TABLE 2-continued

| IMAGE FORMING MODE | | TARGET TRANSFER CURRENT VALUE [mA] PRIMARY TRANSFER PORTION | TARGET TRANSFER CURRENT VALUE [mA] SECONDARY TRANSFER PORTION |
|---|---|---|---|
| WIDE COLOR GAMUT MODE | FOR SINGLE-COLOR | 8 | 12 |
| | FOR MULTICOLOR | 7 | 15 |

During non-image formation (such as during a pre-rotation operation for each print job), the engine control unit 202 adjusts a primary transfer voltage to be applied from the voltage applying units 421 and 422 to their respective primary transfer rollers 6 such that values of currents (primary transfer currents) flowing in the primary transfer portions are target values. During image formation thereafter, the adjusted primary transfer voltage is applied from the voltage applying units 421 and 422 to their respective primary transfer rollers 6.

Specifically, the engine control unit 202 detects as a primary transfer current a current caused to flow between the photosensitive drums 1 uniformly charged to the dark portion potential Vd and the primary transfer rollers 6 by a voltage being applied from the voltage applying units 421 and 422 to their respective primary transfer rollers 6. The primary transfer current is detected using a current detection circuit (not illustrated). The engine control unit 202 performs constant current control using the current detection circuit and the target value of the primary transfer current corresponding to the image forming mode illustrated in Table 2. That is, the engine control unit 202 adjusts the primary transfer voltage such that a value of the primary transfer current detected using the current detection circuit is constant at the target value of the primary transfer current corresponding to the image forming mode.

During non-image formation, the engine control unit 202 adjusts a secondary transfer voltage applied from the voltage applying unit 431 to the secondary transfer roller 11 such that a value of a current (secondary transfer current) flowing in the secondary transfer portion is a target value. During image formation thereafter, the adjusted secondary transfer voltage is applied from the voltage applying unit 431 to the secondary transfer roller 11.

Specifically, the engine control unit 202 detects as the secondary transfer current a current that is made to flow between the driving roller 9 and the secondary transfer roller 11 via the intermediate transfer belt 8 by a voltage being applied from the voltage applying unit 431 to the secondary transfer roller 11 while a printing material is not passing through the secondary transfer portion. The secondary transfer current is detected using a current detection circuit (not illustrated). The engine control unit 202 performs constant current control using the current detection circuit and the target value of the secondary transfer current corresponding to the image forming mode illustrated in Table 2. That is, the engine control unit 202 adjusts the secondary transfer voltage such that a value of the secondary transfer current detected using the current detection circuit is constant at the target value of the secondary transfer current corresponding to the image forming mode.

In the example of settings of Table 2, the target value of the primary transfer current in the single-color wide color gamut mode is set to a value that is higher than the target value of the primary transfer current in the multicolor wide color gamut mode. In the single-color wide color gamut mode, the primary transfer rollers 6 corresponding to their respective toner colors other than the K color are each separated from the corresponding photosensitive drums 1. Therefore, when setting the target value of the primary transfer current for the primary transfer of the single-color (K color) toner image, it is not necessary to consider preventing toner images from being retransferred to the photosensitive drums 1 corresponding to their respective toner colors other than the K color. Therefore, in the example of settings of Table 2, the target value of the primary transfer current in the single-color wide color gamut mode is set to a higher target value suitable for forming a K color solid image.

Meanwhile, in the example of settings of Table 2, the target value of the secondary transfer current in the single-color wide color gamut mode is set to a value that is lower than the target value of the secondary transfer current in the multicolor wide color gamut mode. In the single-color wide color gamut mode, it is sufficient so long as a single-color toner image (for which the amount of toner has been increased to expand the color gamut) can be transferred to a printing material P in the secondary transfer portion. For this reason, in the single-color wide color gamut mode, the target value of the secondary transfer current is set to be lower than a target value for transferring a multicolor toner image to a printing material in the multicolor wide color gamut mode.

In the examples of settings of Tables 1A and 1B, a ratio of a processing speed in the wide color gamut mode to a processing speed in the normal mode is set to about ⅓ for the intermediate transfer belt 8 and a printing material P. Nevertheless, in the example of settings of Table 2, a ratio of the target value of the primary transfer current in the wide color gamut mode to the target value of the primary transfer current in the normal mode is set to be larger than the ratio of the processing speeds for both the single-color mode and the multicolor mode. It is similar for the target value of the secondary transfer current. This is because, in the wide color gamut mode, a larger amount of toner can be transferred, which is carried on the photosensitive drum 1 or the intermediate transfer belt 8, than in the normal mode, onto a transfer-receiving member (the intermediate transfer belt 8 or a printing material P) in each of the transfer portions.

The reason for this is explained as follows. Equation (1) below represents a transfer current for transferring a toner image having a certain amount of charge as an amount of charge per unit area, a weight M, and a width (image width) W to a transfer-receiving member at a predetermined processing speed PS.

$$\begin{aligned} It &= Q/M \times M/S \times PS \times W \\ &= Q/S \times PS \times W \end{aligned} \tag{1}$$

Here, Q is a total amount of charge of the toner image, Q/M is an amount of charge per unit weight of the toner, M/S is a weight of the toner per unit area, and Q/S is an amount of charge of the toner per unit area. In the wide color gamut mode, the amount of toner to be transferred to a transfer-receiving member is increased from that of the normal mode as described above. The total amount of charge Q increases in accordance with the increase in the amount of toner. Therefore, in the wide color gamut mode, it can be said that a transfer current that is greater than about ⅓ of the transfer current in the normal mode is used as the transfer current in the primary transfer portions and the secondary transfer portion, even when the processing speed is set to be about ⅓ of the processing speed in the normal mode.

<Processing Procedure>

Figure 6:
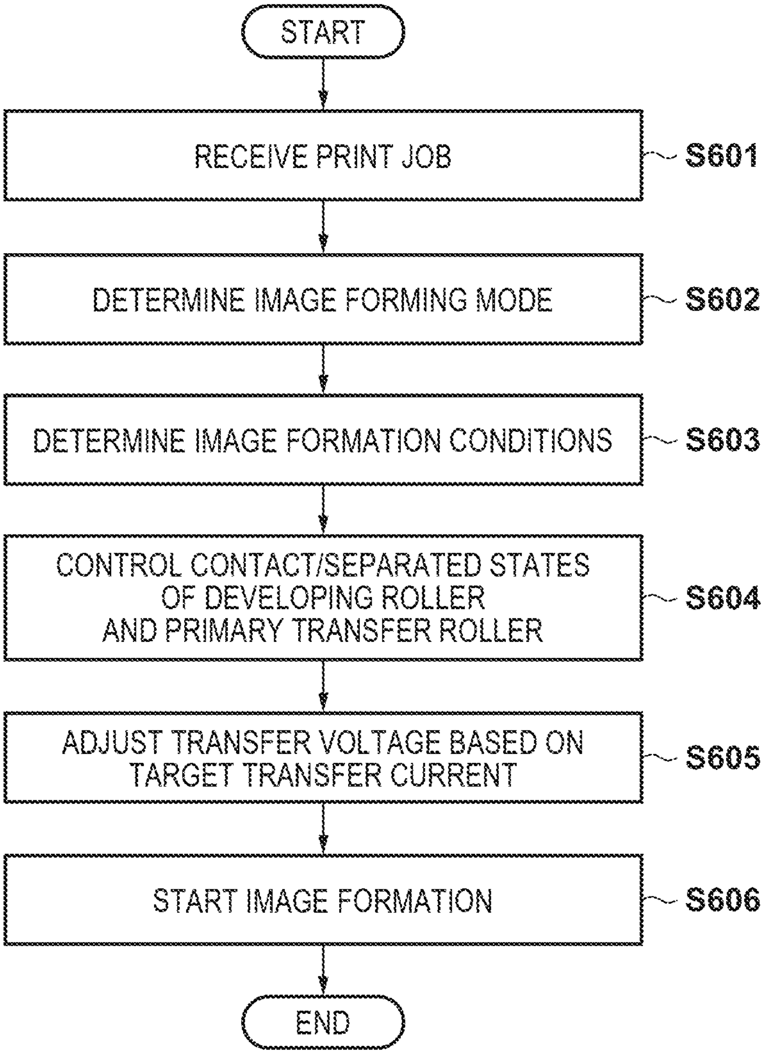
FIG. 6 is a flowchart illustrating an example of a procedure of image forming processing.

FIG. 6 is a flowchart for explaining an example of a procedure of image forming processing to be executed in the image forming apparatus 100 of the present embodiment. The processing of each step of FIG. 6 is executed by the control unit 200 (the printer control unit 201 and the engine control unit 202).

First, in step S601, when a print job is received from the host computer 211 (external apparatus), the printer control unit 201 expands print data included in the print job into image data (an input image according to the print job) that can be used for forming an image. The host computer 211 can perform specification of an image forming mode and the like using a printer driver. The printer control unit 201 transmits the expanded image data and an instruction for executing image formation to the engine control unit 202. The execution instruction includes setting information, such as the image forming mode specified in the print job.

Next, in step S602, the engine control unit 202 determines the image forming mode to be used for forming an image on a printing material based on the specification of the image forming mode and the input image in the print job received by the printer control unit 201 and advances the processing to step S603. For example, if the wide color gamut mode is specified as the image forming mode and the input image is a single-color image in the received print job, the engine control unit 202 determines to use the single-color wide color gamut mode (second single-color mode). In this case, the engine control unit 202 controls the plurality of image forming units 30 to form an image on a printing material in the single-color wide color gamut mode. For example, if the wide color gamut mode is specified as the image forming mode and the input image is a multicolor image in the received print job, the engine control unit 202 determines to use the multicolor wide color gamut mode (second multicolor mode). In this case, the engine control unit 202 controls the plurality of image forming units 30 to form an image on a printing material in the multicolor wide color gamut mode.

In step S603, the engine control unit 202 determines image forming conditions corresponding to the determined image forming mode according to that image forming mode. For example, when the single-color wide color gamut mode is used, the engine control unit 202 determines image forming conditions for forming a single-color image. The image forming conditions may include the ratio of peripheral speeds between the photosensitive drum 1 and the developing roller 3, the developing contrast, and the target transfer current value at the primary transfer portion and the target transfer current value at the secondary transfer portion as described above with reference to Tables 1A and 1B and Table 2. The image forming conditions may further include the driving conditions of the respective driving units (FIG. 3) for the image forming units 30 described above with reference to FIG. 5A.

Next, in step S604, the engine control unit 202 controls a state of contact with/separation from the photosensitive drum 1 for the developing roller 3 and the primary transfer roller 6 for each of the image forming units according to the image forming conditions determined in step S603. When the single-color wide color gamut mode is used, the engine control unit 202 brings the developing roller 3K into contact with the corresponding photosensitive drum 1K and separates the developing rollers 3Y, 3M, and 3K from the corresponding photosensitive drums 1Y, 1M, and 1K, as illustrated in FIG. 5A. Further, the engine control unit 202 brings the primary transfer roller 6K into contact with the corresponding photosensitive drum 1K via the intermediate transfer belt 8 and separates the primary transfer rollers 6Y, 6M, and 6K from the corresponding photosensitive drums 1Y, 1M, and 1K.

In addition, in step S605, the engine control unit 202 adjusts the primary transfer voltage outputted from the voltage applying units 421 and 422 and the secondary transfer voltage outputted from the voltage applying unit 431 based on the target transfer current value at the primary transfer portion and the target transfer current value at the secondary transfer portion determined in step S603. Then, in step S606, the engine control unit 202 starts forming an image based on the print job and ends the processing according to the procedure of FIG. 6.

As described above, in the image forming apparatus 100 of the present embodiment, the engine control unit 202 performs control so as to be allow execution of the normal mode (first mode) and the wide color gamut mode (second mode) in which a color gamut of an image to be formed on a printing material is expanded from that of the normal mode, as an image forming mode. The wide color gamut mode includes the single-color wide color gamut mode (second single-color mode) and the multicolor wide color gamut mode (second multicolor mode), for forming a single-color image and a multicolor image, respectively. The single-color wide color gamut mode (second single-color mode) is a mode in which an image is formed using only the first image forming unit (image forming unit 30K). The multicolor wide color gamut mode (second multicolor mode) is a mode in which an image is formed using the first image forming unit and the second image forming unit (image forming units 30Y, 30M, or 30C). In the single-color wide color gamut mode, the engine control unit 202 is configured so as not to use image forming units other than the image forming unit 30K among the plurality of image forming units 30 and cause only the image forming unit 30K corresponding to the K color (first color) to form a K color toner image.

This makes it possible to form an image according to image forming conditions for forming a single-color image, even when forming a single-color image in the wide color gamut mode. Therefore, according to the present embodiment, it is possible to output a single-color image of higher quality and density when outputting a single-color image in the wide color gamut mode in an image forming apparatus including the wide color gamut mode.

Second Embodiment

In a second embodiment, another example of the single-color wide color gamut mode (second single-color mode) described in the first embodiment will be described. In the single-color wide color gamut mode in the present embodiment, an image is formed in a state in which not only the developing roller 3K corresponding to the K color but also the developing rollers 3Y, 3M, and 3C corresponding to toner colors other than the K color are in contact with the corresponding photosensitive drums 1Y, 1M, and 1C, respectively. Alternatively, an image is formed in a state in which not only the primary transfer roller 6K corresponding to the K color but also the primary transfer rollers 6Y, 6M, and 6C corresponding to toner colors other than the K color are in contact with the photosensitive drums 1Y, 1M, and 1C via the intermediate transfer belt 8. In the following, descriptions will be omitted for parts common to the first embodiment, and parts different from the first embodiment will be mainly described.

Normally, when an image in which a ratio of an area covered by toner to the entire output image is high, formed based on an input image is formed as a K single-color image, most of the base of a printing material is hidden by K color toner, which has the lowest brightness among a plurality of colors of toner. In this case, the effect of the color cast toner caused by primary transfer of a toner image from the photosensitive drum 1 being possible in the plurality of image forming units is relatively small.

Meanwhile, slipperiness between a printing material and toner for when the toner is transferred to the printing material increases. Blurring and banding (light and dark bands) are likely to occur in a transferred toner image, attributable to an image pattern to be outputted. In the single-color wide color gamut mode in the first embodiment, the aforementioned slipperiness may be further increased due to the amount of toner supplied to the photosensitive drum 1K being increased compared to that of the normal mode. This may make it more likely for blurring and banding to occur in the transferred toner image. Examples in which such a phenomenon becomes apparent include blurring of a toner image to be transferred to the intermediate transfer belt 8 next, which occurs when a trailing end of a printing material P exits the secondary transfer roller 11 on the conveyance path; blurring during development on the photosensitive drum 1; and the like.

In addition, the image forming apparatus 100 may receive, for example, a print job in which a multicolor image and a single-color image are included as input images from the host computer 211. When executing such a print job in the wide color gamut mode, an operation is performed for switching the developing unit 20 between a state of contact with and a state of separation from the photosensitive drum 1 for three colors other than the K color when printing a multicolor image and when printing a single-color image. In addition, an operation is also performed for switching the primary transfer roller 6 between a state of contact with and a state of separation from the photosensitive drum 1 for three colors other than the K color. Repeating such an operation increases the time it takes until the execution of the print job is completed, thereby decreasing the productivity of the image forming apparatus 100.

Therefore, in the present embodiment, in order to address one or more of the above-described problems, the engine control unit 202 includes a setting 1 and a setting 2 illustrated in FIG. 5B as settings for driving conditions of the respective driving units (FIG. 3) in the single-color wide color gamut mode. Specifically, when a print job received from an external apparatus does not satisfy a predetermined condition, the engine control unit 202 uses the driving conditions of the setting 1 in the single-color wide color gamut mode. The setting 1 is similar to the setting for driving conditions for the single-color wide color gamut mode illustrated in FIG. 5A. Meanwhile, when a print job received from an external apparatus satisfies a predetermined condition, the engine control unit 202 uses the driving conditions of the setting 2 in the single-color wide color gamut mode.

The aforementioned predetermined condition is, for example, an input image according a print job being a single-color image and a ratio of an area covered by toner to the entire output image formed based on the input image exceeds a threshold. Alternatively, the predetermined condition is a single-color image and a multicolor image being included as input images according to a print job. When such a condition is met, the engine control unit 202 uses the setting 2 illustrated in FIG. 5B in the single-color wide color gamut mode.

When the setting 2 illustrated in FIG. 5B is used, the engine control unit 202 brings not only the developing roller 3K of the image forming unit 30K but also the developing rollers 3Y, 3M, and 3C of the image forming units other than the image forming unit 30K into contact with the respective corresponding photosensitive drums 1 in the single-color wide color gamut mode. In addition, the engine control unit 202 brings not only the primary transfer roller 6K of the image forming unit 30K but also the primary transfer rollers 6Y, 6M, and 6C of the image forming units other than the image forming unit 30K into contact with the respective corresponding photosensitive drums 1 via the intermediate transfer belt 8.

In the present embodiment, the control unit 200 (the printer control unit 201 and the engine control unit 202) executes image forming processing according to a procedure similar to that in the first embodiment (FIG. 6). However, when the single-color wide color gamut mode is used, the engine control unit 202 controls contact/separated states of the developing roller 3 and the primary transfer roller 6 in steps S603 and S604 using the driving conditions of the setting 2 according to the predetermined condition as described above.

As described above, according to the present embodiment, when the single-color wide color gamut mode (second single-color mode) is used, the wide color gamut mode of the setting 2 is used according to the predetermined condition. This makes it possible to address an increase in the slipperiness between a printing material and toner for when the toner is transferred to the printing material, thereby making it possible to reduce occurrence of blurring and banding in a transferred toner image attributable to an image pattern to be outputted. Further, when a multicolor image and a single-color image are included as input images according to a print job, it is possible to output a single-color image of higher quality while maintaining the productivity of the image forming apparatus 100.

Each of the above-described embodiments can be modified in various ways. For example, the engine control unit 202 may drive the photosensitive drums 1Y, 1M, and 1C to rotate at a rotational speed different from that of the photosensitive drum 1K so as to attain more of a braking effect (for reducing banding by suppressing the unevenness of rotation of the photosensitive drum 1) in an additional mode. In the single-color wide color gamut mode, the mode may be set so as to set not only a developing setting and the transfer setting but also, for example, a setting for fixing temperature adjustment in the fixing unit 18, to a setting suitable for forming a single-color image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:

a first image forming unit including a first image bearing member and a first developing unit configured to form a toner image by developing an electrostatic latent image formed on the first image bearing member;

a second image forming unit including a second image bearing member and a second developing unit configured to form a toner image by developing an electrostatic latent image formed on the second image bearing member;

an intermediate transfer member on which the toner image formed on the first image bearing member and the toner image formed on the second image bearing member are transferred so as to be overlapped, the toner images transferred to the intermediate transfer member being to be transferred to a printing material; and a control unit configured to control the first image forming unit and the second image forming unit, wherein the first image forming unit further includes a first primary transfer unit configured to transfer the toner image formed on the first image bearing member to the intermediate transfer member, and the second image forming unit further includes a second primary transfer unit configured to transfer the toner image formed on the second image bearing member to the intermediate transfer member, and wherein the control unit performs control to perform a first mode and a second mode in which a color gamut of an image to be formed on a printing material is expanded from the first mode, as an image forming mode for forming an image on a printing material, and the second mode includes a third mode in which image formation is performed by only the first image forming unit and a fourth mode in which image formation is performed by the first image forming unit and the second image forming unit, wherein, in the third mode, the control unit i) brings the first developing unit into contact with the first image bearing member and separates the second developing unit from the second image bearing member, ii) brings the first primary transfer unit into contact with the first image bearing member via the intermediate transfer member and separates the second primary transfer unit from the second image bearing member, iii) controls the first image forming unit so as to form an image according to an image forming condition for forming a single-color image, wherein, in the fourth mode, the control unit iv) brings the first and second developing units into contact with the first and second image bearing members, respectively, and v) brings the first and second primary transfer units into contact with the first and second image bearing members, respectively, via the intermediate transfer member.

2. The image forming apparatus according to claim 1, wherein in a case where the second mode is specified as the image forming mode in a print job received from an external apparatus and an input image according to the print job is a single-color image, the control unit controls the first and second image forming units so as to form an image on a printing material in the third mode.

3. The image forming apparatus according to claim 1, further comprising:

a first voltage applying unit configured to apply a primary transfer voltage to the first primary transfer unit, and a second voltage applying unit configured to apply a primary transfer voltage to the second primary transfer unit, and in the third mode, the control unit sets a target value of a primary transfer current to a value that is higher than a target value of the primary transfer current in the fourth mode, the primary transfer current being caused to flow in the primary transfer portion corresponding to the first image forming unit by the first voltage applying unit applying the primary transfer voltage.

4. The image forming apparatus according to claim 3, further comprising:

a secondary transfer unit configured to transfer the toner images transferred to the intermediate transfer member to a printing material at a secondary transfer portion; and a third voltage applying unit configured to apply a secondary transfer voltage to the secondary transfer unit, wherein in the third mode, the control unit sets a target value of a secondary transfer current to a value that is lower than a target value of the secondary transfer current in the fourth mode, the secondary transfer current being caused to flow in the secondary transfer portion by the third voltage applying unit applying the secondary transfer voltage.

5. The image forming apparatus according to claim 1, wherein in the second mode, the control unit sets a ratio of peripheral speeds to be higher than a ratio of peripheral speeds in the first mode, the ratio of peripheral speeds being a ratio of a peripheral speed of the first and second developing units to a peripheral speed of the first and second image bearing members.

6. The image forming apparatus according to claim 1, wherein in the second mode, the control unit sets a developing contrast for developing the electrostatic latent images formed on the first and second image bearing members with toner to be greater than a developing contrast in the first mode.

7. The image forming apparatus according to claim 1, wherein in the second mode, the control unit sets a potential difference between a dark portion potential and a light portion potential on the first and second image bearing members on which the electrostatic latent images are formed to be greater than a potential difference in the first mode.

8. The image forming apparatus according to claim 1, wherein in a case where the second mode is specified as the image forming mode in a print job received from an external apparatus and an input image according to the print job is a multi-color image, the control unit controls the first and second image forming units so as to form an image on a printing material in the fourth mode.

9. The image forming apparatus according to claim 1, wherein in a case where the second mode is specified as the image forming mode in a print job received from an external apparatus and input images according to the plurality of print jobs are a single-color image and a multi-color image, the control unit controls the first and second image forming units so as to form an image on a printing material in the fourth mode.

* * * * *